(12) United States Patent
May et al.

(10) Patent No.: US 6,604,338 B1
(45) Date of Patent: Aug. 12, 2003

(54) PACKAGING DEVICE FOR ATTACHMENT OF CLIPS TO A CONTINUOUSLY MOVING TUBE OF CASING

(75) Inventors: Dennis J. May, Moncure, NC (US); Kuo-Raid Grant Chen, Cary, NC (US); Brian K. Digeso, Raleigh, NC (US); Samuel D. Griggs, Raleigh, NC (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/806,396
(22) PCT Filed: Jan. 1, 1999
(86) PCT No.: PCT/US99/22921
§ 371 (c)(1), (2), (4) Date: Mar. 29, 2001
(87) PCT Pub. No.: WO00/20282
PCT Pub. Date: Apr. 13, 2000

Related U.S. Application Data

(60) Provisional application No. 60/107,429, filed on Nov. 6, 1998, and provisional application No. 60/102,826, filed on Oct. 2, 1998.

(51) Int. Cl.$^7$ .............................................. B65B 51/04
(52) U.S. Cl. ...................... 53/138.2; 53/138.3; 53/138.4
(58) Field of Search .............................. 53/138.2, 138.3, 53/138.4, 138.6, 138.8

(56) References Cited

U.S. PATENT DOCUMENTS

| | | | |
|---|---|---|---|
| 3,383,754 A | 5/1968 | Klenz | |
| 3,543,378 A | 12/1970 | Klenz | |
| 3,583,506 A | 6/1971 | Klenz | |
| 3,783,583 A | 1/1974 | Dobbert | |
| 3,795,058 A | 3/1974 | Andre | |
| 4,001,926 A | 1/1977 | Velarde | |
| 4,189,897 A | 2/1980 | Ailey | |
| 4,578,928 A | 4/1986 | Andre | |
| 4,821,485 A | 4/1989 | Evans et al. | |
| 4,939,885 A | * | 7/1990 | Steinke |
| 5,109,648 A | 5/1992 | Evans | |
| 5,586,424 A | 12/1996 | Chen et al. | |
| 5,644,896 A | 7/1997 | Evans et al. | |
| 5,771,664 A | 6/1998 | Recchia, Jr. | |
| 6,219,998 B1 | * | 4/2001 | Demming et al. |

* cited by examiner

Primary Examiner—Eugene Kim
(74) Attorney, Agent, or Firm—Banner & Witcoff, Ltd.

(57) ABSTRACT

An apparatus for attaching shaped metal clips at intervals to viscous-product-filled casing includes a support frame, a clipper assembly, a clipper assembly mounting rail, and a clipper assembly reciprocation mechanism. The clipper assembly is reciprocally mounted for reciprocal movement back and forth between a first casing entry station and a second casing exit station. A continuous tube of filled casing enters the apparatus at the first station and exits at the second station. The clipping assembly includes a filled casing support passage. Filled casing is directed through this passage as the casing extends between the first and second stations. The clipper assembly further includes first and second casing gathering plates which are projectible into the passage to gather the filled casing to form a neck section therein. The neck section is for attachment of at least one clip about the casing. In the region between the first and second stations, the tube of casing is clipped by the reciprocating clipper assembly, which further includes a clipper mechanism for attachment of clips about the gathered casing.

4 Claims, 12 Drawing Sheets

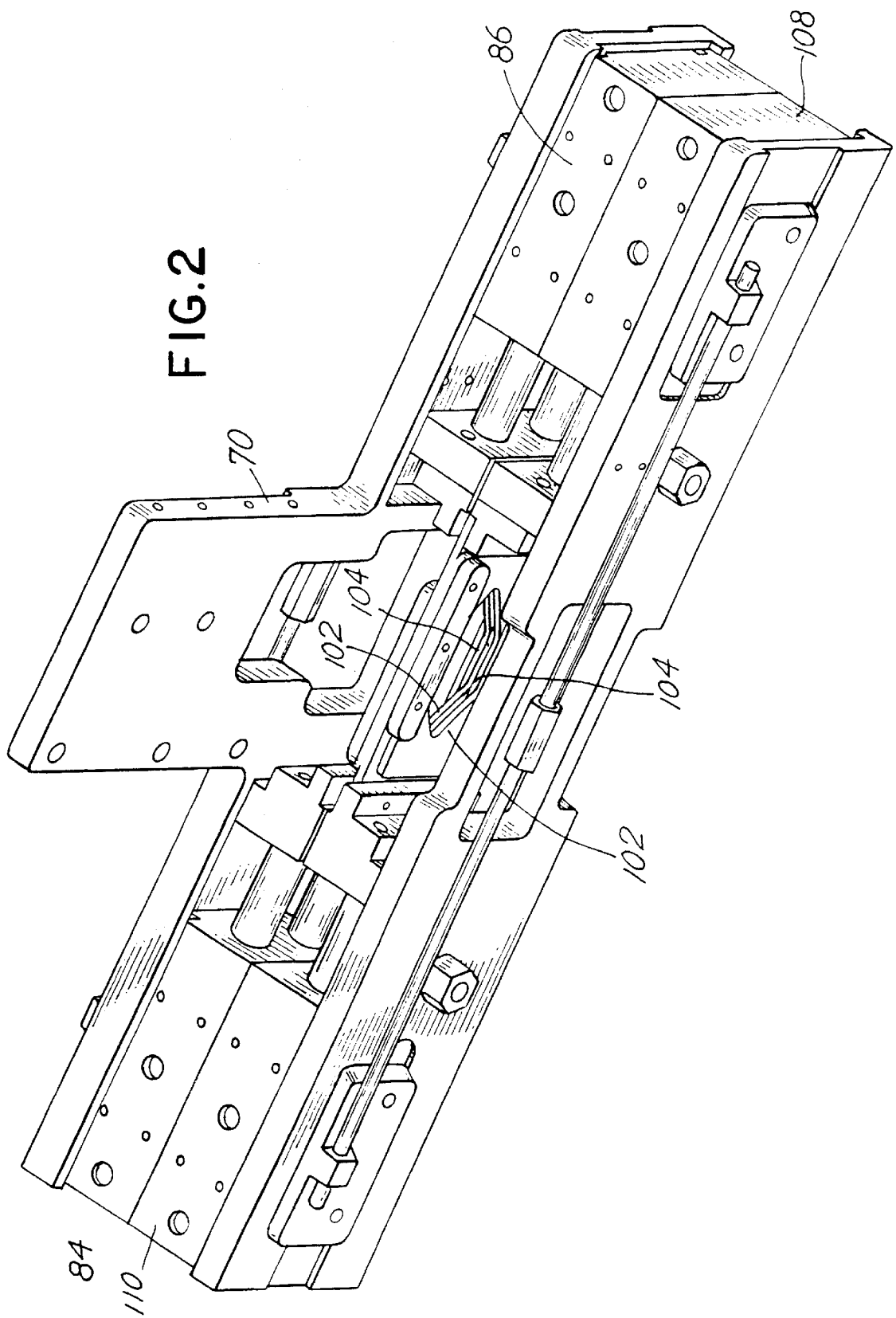

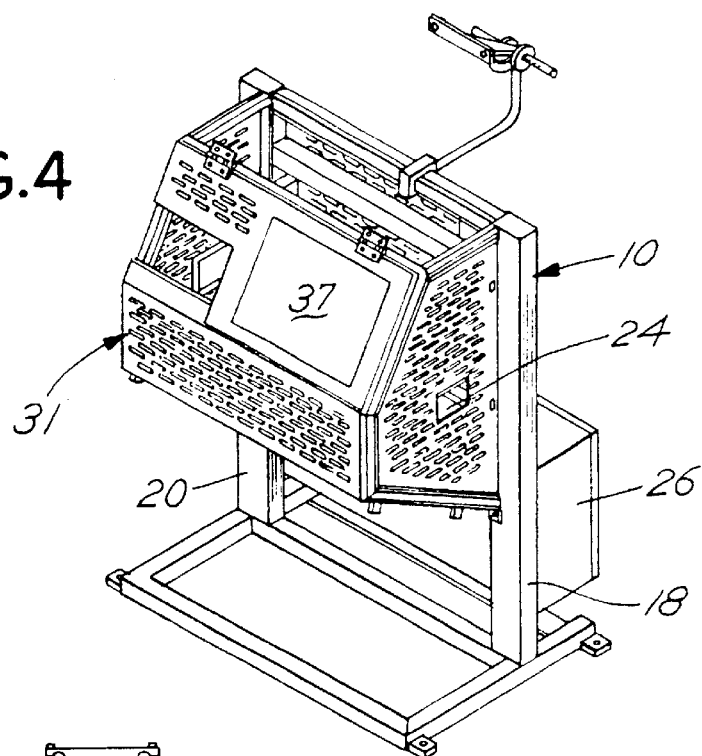
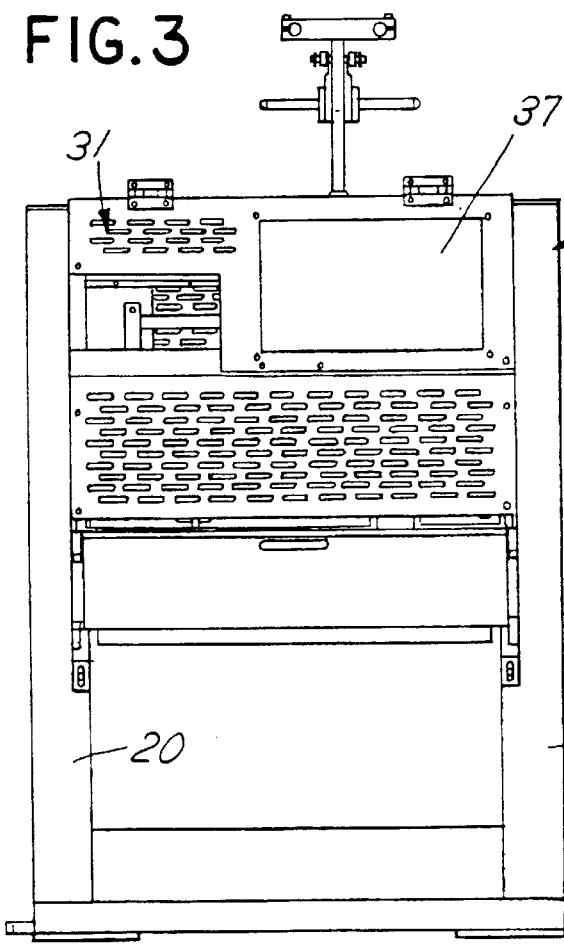
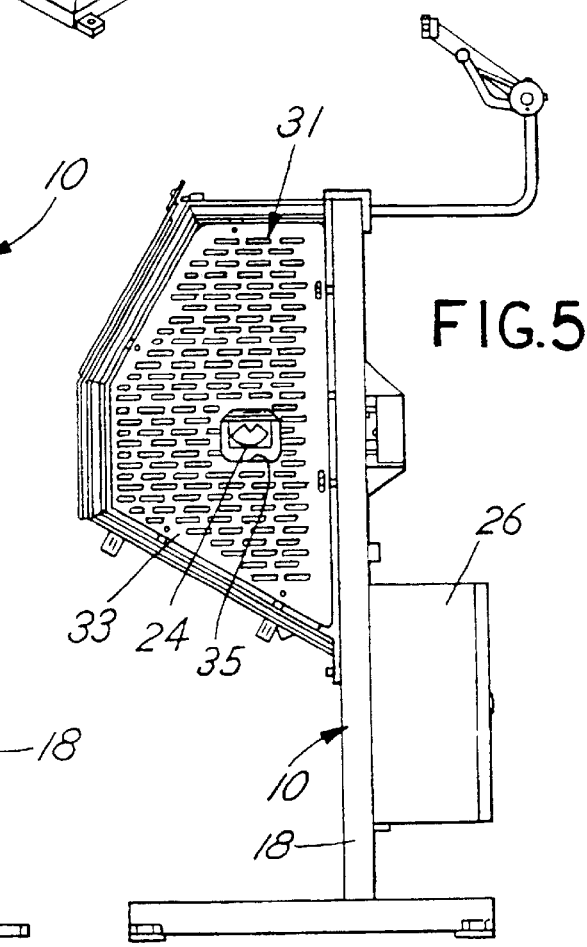

PACKAGING DEVICE FOR ATTACHMENT OF CLIPS TO A CONTINUOUSLY MOVING TUBE OF CASING

This application claims the benefit of provisional applications 60/102,826 filed Oct. 2, 1998 and 60/107,429 filed Nov. 6, 1998.

BACKGROUND OF THE INVENTION

This invention relates to apparatus for attachment of U-shaped metal clips to a tube of flexible casing material which has been filled with a viscous product. The apparatus applies clips to the casing as the filled casing-product is moving. The invention further relates to a mechanism for attaching metal clips to casing at intervals along the casing thereby sealing product within the casing in the form of separate links as the filled casing is moving continuously.

Various food products, such as sausage or cheese, are packaged in flexible, tubular casing by attaching metal clips to the filled casing at spaced intervals thereby sealing and closing the product within the casing, Klenz, U.S. Pat. No. 3,383,754 issued May 21, 1968. incorporated herewith by reference, discloses a device adapted for applying U-shaped metal clips about casing. Klenz discloses the use of a punch for driving a U-shaped metal clip through a channel against a die to form the clip about filled and gathered casing material aligned between the punch and the die. Klenz, U.S. Pat. No. 3,543,378 discloses the use of a pair of clippers arranged in tandem and cooperative with opposed, moveable, casing gathering plates defining a pair of clip channels. The gathering plates move in opposition to each other to gather filled casing material into a constricted form. Two U-shaped metal clips are then driven in channels defined by the gathering plates by punches about the gathered material to seal the ends of adjacent links of the casing. A knife then cuts the casing between the clips to separate the links defined by the clipped casing.

Other patents disclose various combinations of gathering mechanisms for gathering casing prior to attachment of the clip or clips, including Klenz U.S. Pat. No. 3,583,506; Dobbert, U.S. Pat. No. 3,783,583; and Velarde, U.S. Pat. No. 4,001,926.

Various mechanisms have been suggested for improving the efficiency and speed of operation of clipping mechanisms when forming links of product in a continuous or assembly line operation. Andre, U.S. Pat. No. 3,795,058 discloses a single clipper mounted at a work station of rotating table. The table moves intermittently from station to station between operations performed at each station, including a clip attachment station. Andre, U.S. Pat. No. 4,578,928 discloses a circular table wherein filled casing material is transported from station to station for ultimate attachment of the clip. Ailey, U.S. Pat. No. 4,189,897, discloses a similar multiple station apparatus.

Evans et al., U.S. Pat. No. 4,821,485 disclose apparatus for attaching clips to form separate links in an operation wherein the filled casing is continuously moving in a circular pattern with the filed casing being gathered and clipped as the product and casing move continuously by and through the apparatus. The various operational stations move with the casing in a continuous circular motion about a center pivot and the various gathering and clipping operations are performed as the apparatus rotates about the pivot in a single direction.

The need has remained for a high speed continuously operating packaging device for attachment of metal clips to flexible, generally cylindrical, continuously moving casing filled with a viscous material. Such a need has been considered desirable to form links of various diameter and length filled with various materials in a continuous operation.

SUMMARY OF THE INVENTION

In a principal aspect, the present invention is an improved mechanism for sealing filled and continuously moving casing in discreet links or lengths. The apparatus includes a frame on which a reciprocating clipper assembly is mounted. The clipper assembly reciprocates continuously back and forth between a first or casing entry station and a second or casing exit station. Flexible casing, which has been prefilled with viscous material, enters the apparatus at the first station and is discharged from the second station. In the region between the first and second stations, the clipping assembly is designed to reciprocate at the same speed or synchronously with the rate of movement of the filled casing material moving forward between the first and second stations.

As the clipper assembly moves forwardly with the filled casing material, it effects gathering of the casing in order to form a necked portion thereof. The gathering operation includes voiding of a certain portion of the casing by and between a pair of gathering plates which initially constrict the casing and the separate to void the viscous filling material in the casing from the region of the constriction. The gathering plates separate or spread to ensure that a length or tail of constricted or necked casing is provided.

A pair of spaced, U-shaped metal clips is then applied to the necked casing by clipper subassemblies which are positioned intermediate the spaced gathering plates. The clips are applied simultaneously by the clipper subassemblies to the necked casing "on the fly" as the casing and clipper assembly move between the first and second stations. Thereafter, optionally, the clipper assembly effects a cut or severance of the casing between the attached metal clips so that separate links are formed. The filled casing, having the clips attached thereto, is next released at the second station.

The clipping assembly then reciprocates or moves in the reverse direction from the second station back to the first station without impeding the continuous forward movement or progress of the filled casing between the first and second stations. Upon arrival at the first station, the clipper assembly again begins its synchronous movement with the filled casing to effect attachment of further clips thereto.

Thus, it is an object of the invention to provide an improved packaging device for filling flexible tubular casing filled with a viscous material.

A further object of the invention is to provide an improved packaging device with apparatus for attachment of U-shaped metal clips to flexible tubular casing.

Yet another object of the invention is to provide a continuously operating packaging device adapted to receive tubular casing material filled with a viscous product as that filled casing moves uninterruptedly and continuously in a generally linear direction.

Yet another object of the invention is to provide a clipper assembly which reciprocates between an entry station and an exit station and, which during movement from the entry station to the exit station, effects voiding of a section of the filled casing and attachment of one or more clips thereto.

Yet another object of the invention is to provide a packaging device which is capable of manufacture of a wide range of lengths of link product.

Another object of the invention is to provide an improved clip attachment mechanism having simplified construction and which is compact, yet which permits extremely high speed operation relative to prior art packaging devices:

These and other objects, advantages and features of the invention All be set forth in the detailed description which follows.

BRIEF DESCRIPTION OF THE DRAWING

In the detailed description which follows reference will be made to the drawing comprised of the following figures:

FIG. 2 is an isometric view of the internal construction of the gathering plates used in the apparatus of the invention.

FIG. 3 is a front elevation of the apparatus of the invention;

FIG. 4 is an isometric view of the apparatus of the invention;

FIG. 5 is a side elevation of the apparatus of the invention;

DESCRIPTION OF THE PREFERRED EMBODIMENT

Figure 1:
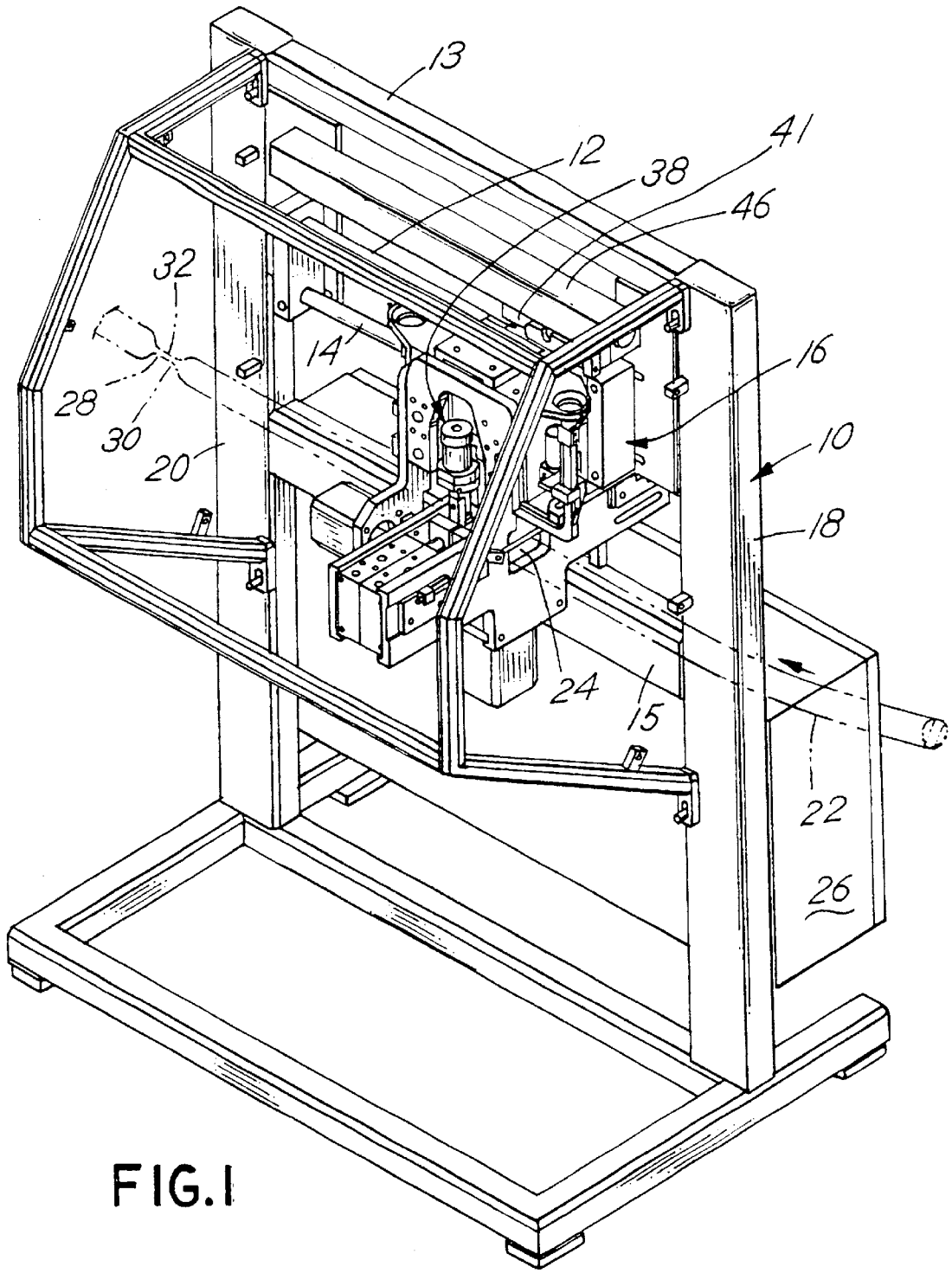
FIG. 1 is an isometric view of the apparatus of the invention.
Figure 6:
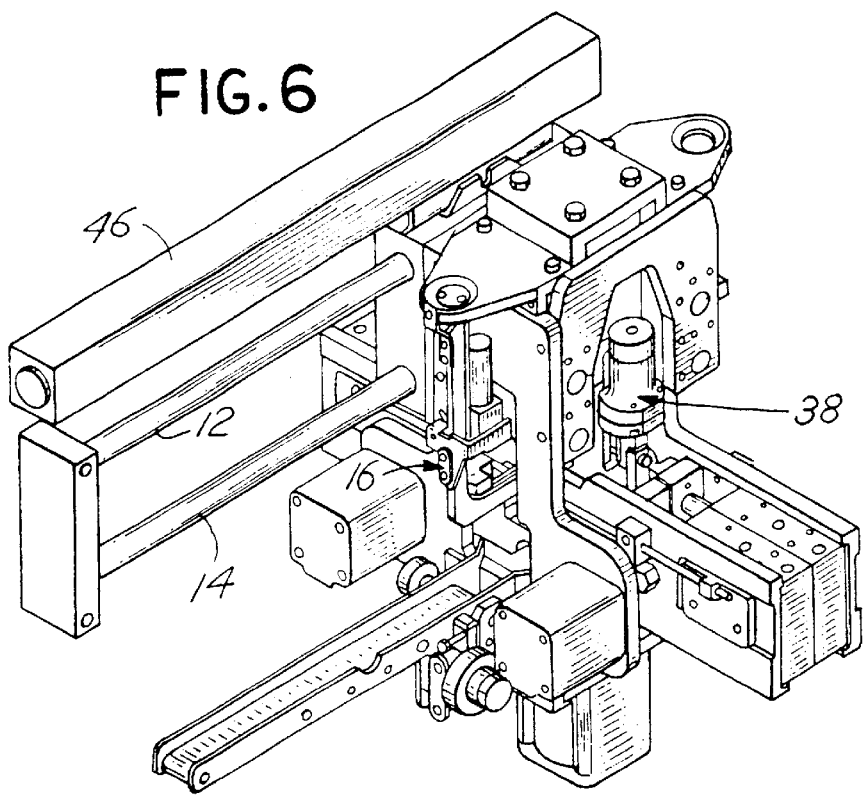
FIG. 6 is an isometric view of the clipper of the invention and the reciprocal mounting bars for the clipper.
Figure 7:
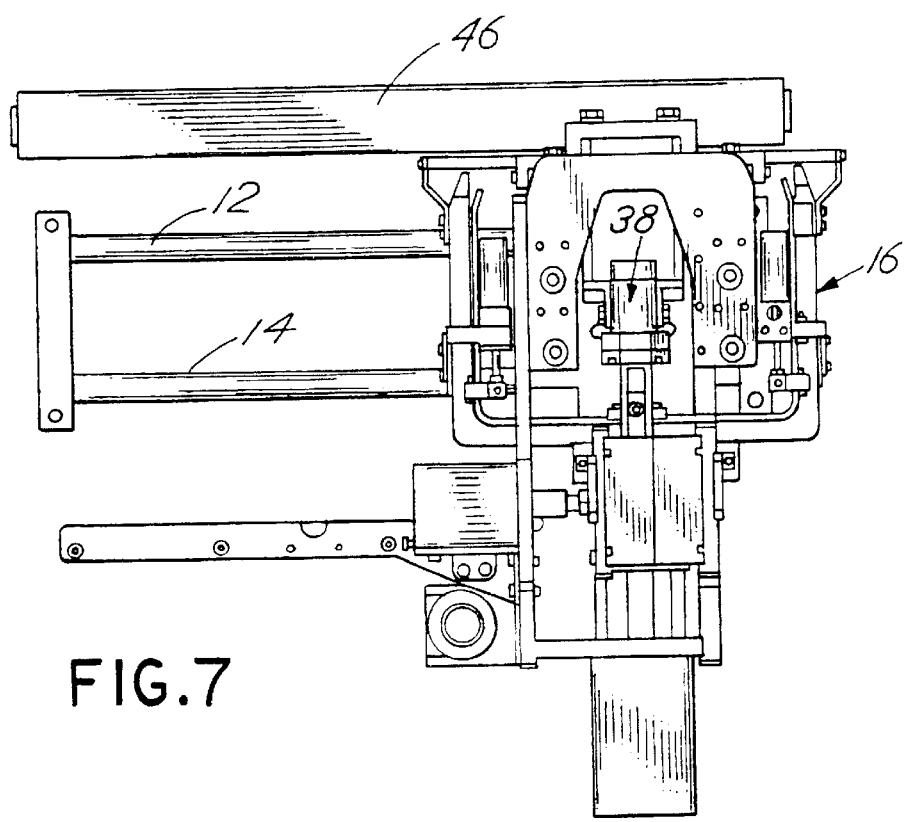
FIG. 7 is a front elevation of the clipper of FIG. 6.

FIGS. 1 and 2 depict a frame 10 which supports a dual rail comprised of first and second, or upper and lower horizontal, spaced rail bars or rods 12 and 14. A clipper assembly 16 is reciprocally mounted on the rods or bars 12 and 14 (FIG. 6) and is powered to reciprocate between a first or entry station adjacent a first vertical support beam 18 of frame 10 and a second or exit station adjacent a second vertical support beam 20. Previously product filled, flexible, casing 22 continuously moves between the first and second stations in the forward direction indicated by the arrow and extends or fits through a passage or opening 24 of the clipper assembly 16. The casing 22 is filled in a separate apparatus such as depicted and/or discussed in the prior art patents referenced above, all of which are incorporated herewith by reference.

As the casing 22 moves continuously in the forward direction as described, the clipper assembly 16 is driven by a reciprocating drive piston assembly or actuator 46 and reciprocates between the first or entry station, and the second or exit station moving either forward synchronously with casing 22 or in the opposite direction. Movement and operation of assembly 16 is controlled by a control mechanism retained in the control box 26. The clipper assembly 16 moves from the first station to the second station synchronously with the movement of the casing 22 as the casing 22 is necked, voided and a clip or clips 28, 30 are attached. After clips 28, 30 have been attached to the casing 22, the clipper assembly 16 will release the casing and reciprocate to the first station from the second station by movement opposite to the movement of the casing 22. The assembly 16 may then repeat its sequential operation and move synchronously once again with the movement of the casing 22 for gathering and attachment of yet a further clip or set of clips, subsequent release and then reverse movement.

As shown in FIG. 1, a pair of U-shaped metal clips 28, 30 of the type depicted in the prior art references referenced above are attached to the casing 22 at discrete length intervals to form links in the casing 22. First, however, gathered casing 22 is formed or gathered to form a tight neck, for example, neck 32. After the neck 32 is formed, the clips 28 and 30 are applied thereto. The casing 22 intermediate the clips 28 and 30 may be severed by means of a knife 29. In this manner, the casing 22 may be cut into separate links.

Figure 13:
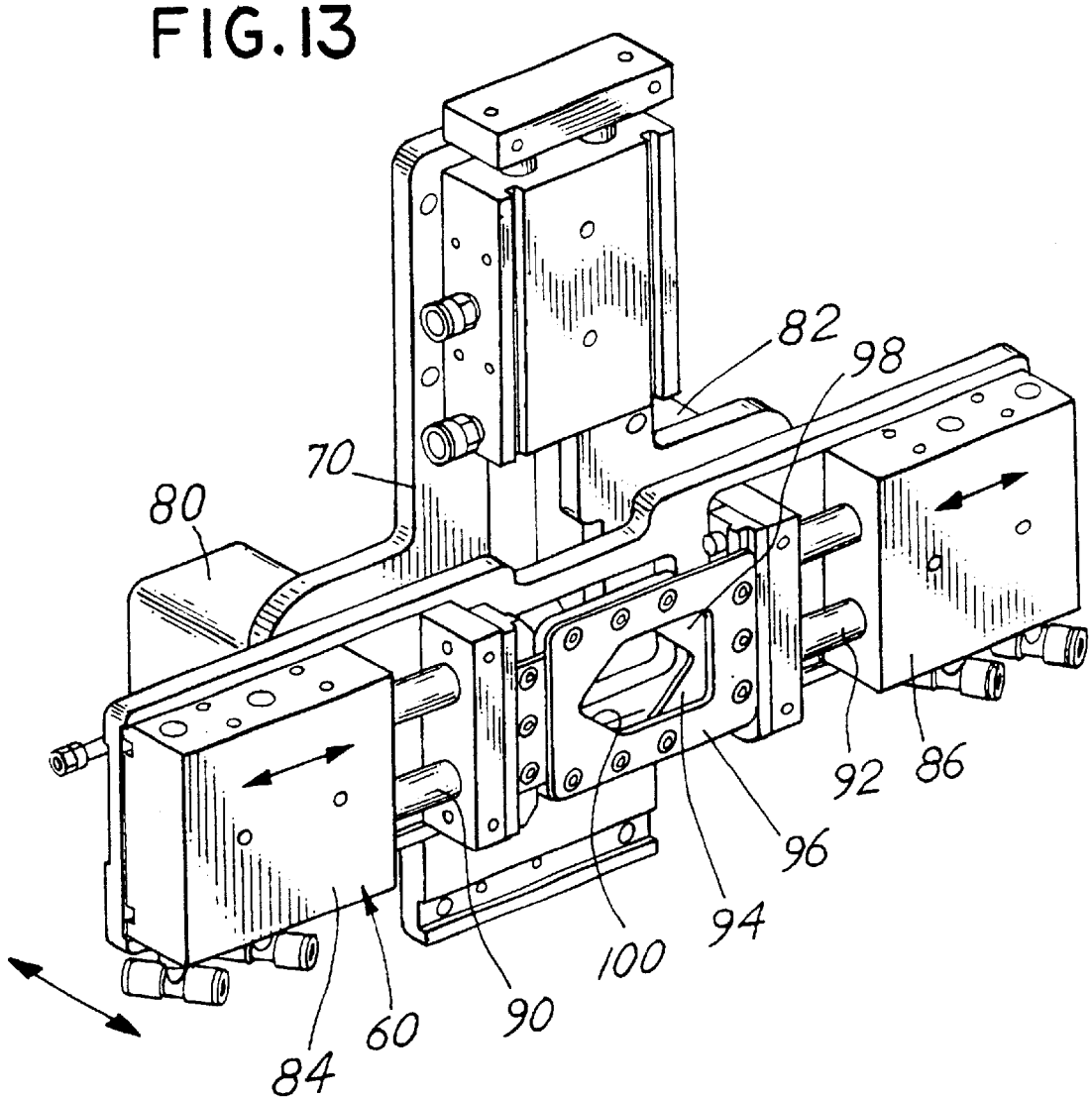
FIG. 13 is a cutaway isometric view of the assembly of FIG. 11 viewed along the plane 13—13 in FIG. 11.
Figure 14:
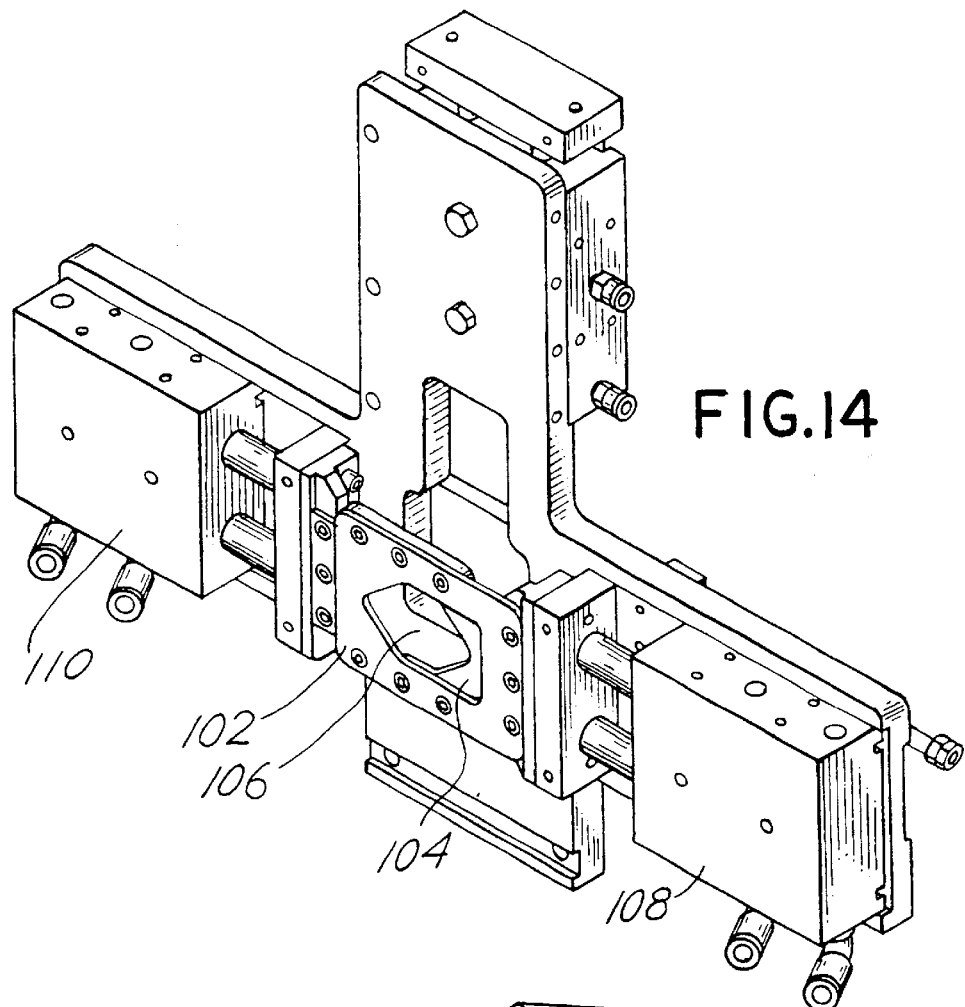
FIG. 14 is a cutaway isometric view of the assembly of FIG. 11 viewed along the plane 14—14 in FIG. 11.

In review, prior to attachment of clips 28 and 30, gathering plates, such as gathering plates 94 96, 102, 104 in FIGS. 2, 13, 14 engage the casing material 22 to form the neck 32 and to void a portion of the casing 22 of material filling the casing in the neck 32. The plates 94, 96, 102, 104 then separate slightly during movement in the direction of casing 22 movement to define a length of the necked section 32. One or more clips 28, 30 may then be attached to the neck or necked portion 32 by means of a clipper 38. An important feature of the invention is the mechanism associated with the plates 94, 96, 102, 104. The mechanism provides that the plates 94, 96, 102, 104 will cause the necking of the casing 22 and voiding of material from the casing 22 in the region where it is necked.

The sequence of operations of the clipper assembly 16 includes initial movement of the entire assembly 16 synchronously forward with the casing 22, followed by operation of the gathering plates 94, 96, 102, 104 to gather and void the casing 22 and to then separate so as to define a neck 32. Thereafter, the clipper 38 operates to place two spaced U-shaped metal clips 28, 30 about the casing 22 to seal the ends of separate links of the casing 22. Thereafter, and optionally, a knife 95 may sever the casing 22 between the applied clips 28, 30 and through the neck 32. Thereafter, the knife 95, the clipper 38, and the gathering plates 94, 96, 102, 104 are released from the casing 22 and the clipper assembly 16 is traversed back to the first station with the filled casing 22 sliding through the passage 24 in the clipper assembly 16. While at the first station, the clipper assembly 16 may dwell so that the length of filled casing 22 passing through the assembly 16 will be as desired to form an appropriate length of link. The movement of the assembly 16 may then be commenced and the operation of attachment of a clip or clips 28, 30 is repeated.

Apparatus of the type described have been developed to provide for a cycle time of assembly 16 movement between the first and second stations of 1.5 seconds thereby resulting in extremely fast, operation relative to prior art, operations. Moreover, the apparatus of the invention is especially compact relative to the prior art constructions.

Referring again to the figures, frame 10 is comprised of first and second vertically upstanding spaced support beams 18 and 20. The support beams 18 and 20 are connected by horizontal cross members 13 and 15 to thereby define a support for slide bars 12, 14 that support the reciprocating clipper assembly 16. The entire construction is typically retained in a housing 31 such as depicted in FIG. 3 comprised of enclosing panels. The housing 31 includes an entry end panel 33 into which filled casing 22 is inserted through an inlet passage 35. An exit passage (not shown) in the opposite outside panel of the housing 31 is provided for discharge of filled casing 22. An observation opening or window 37 is provided in the front of the housing 31. The entire construction may be mounted on a wheeled carriage (not shown) and may be constructed so that beams 18, 20 telescope to be movable in the vertical direction in order to align the casing inlet 35 appropriately with the discharge outlet from a product filling machine, for example.

Figure 8:
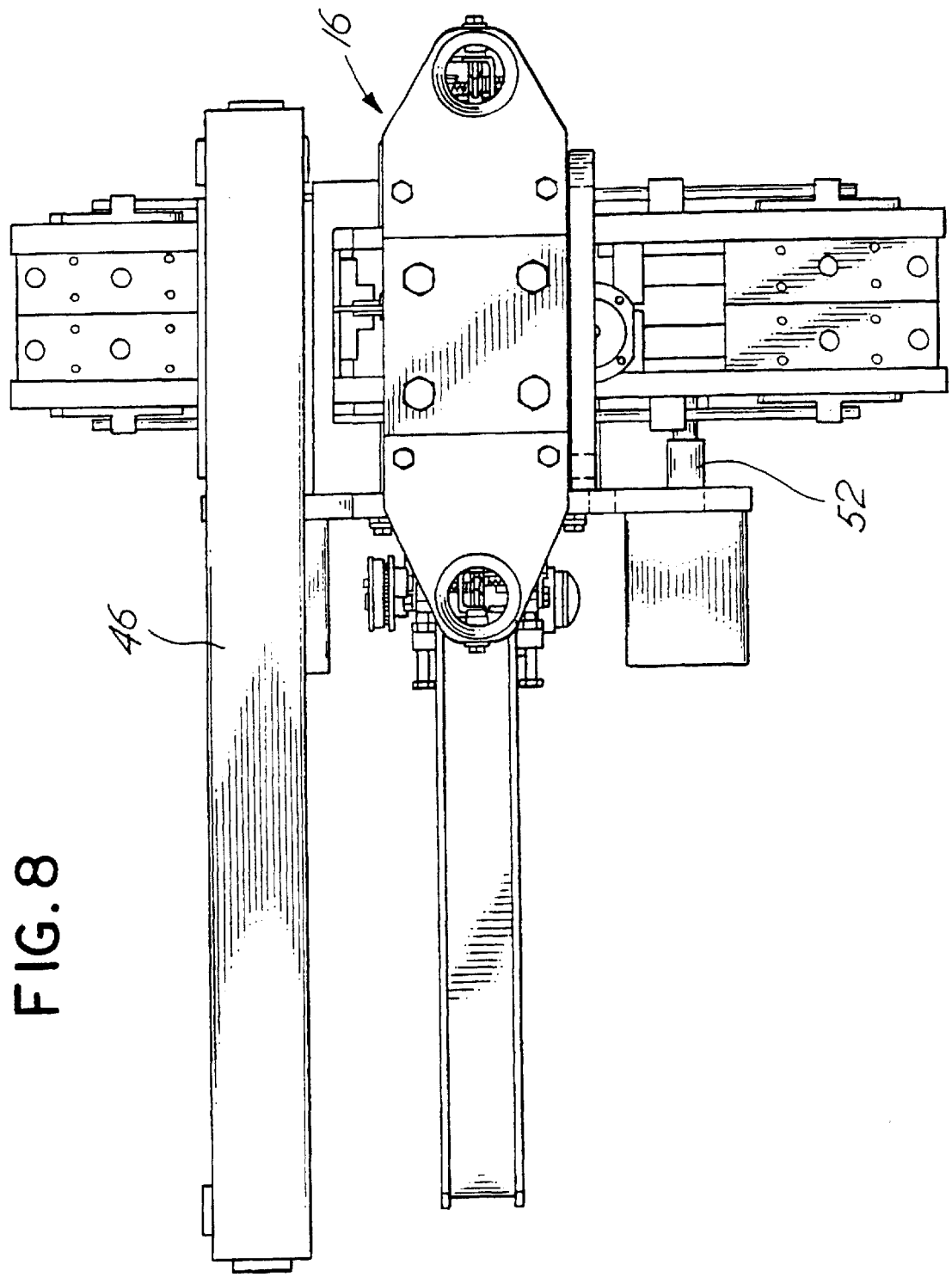
FIG. 8 is a top plan view of the clipper assembly of FIG. 6.
Figure 9:
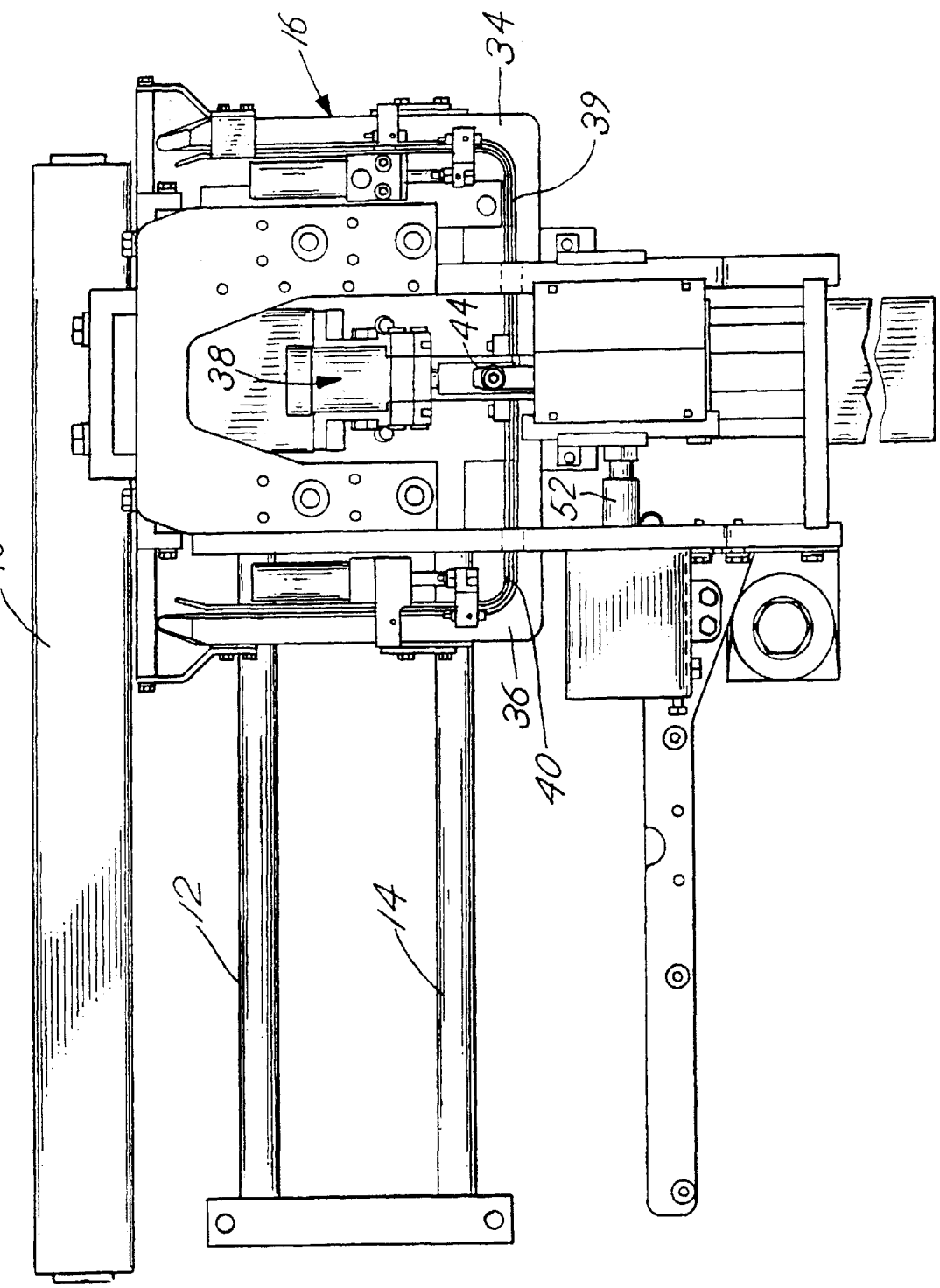
FIG. 9 is a side elevation of the clipper assembly of FIG. 6.
Figure 10:
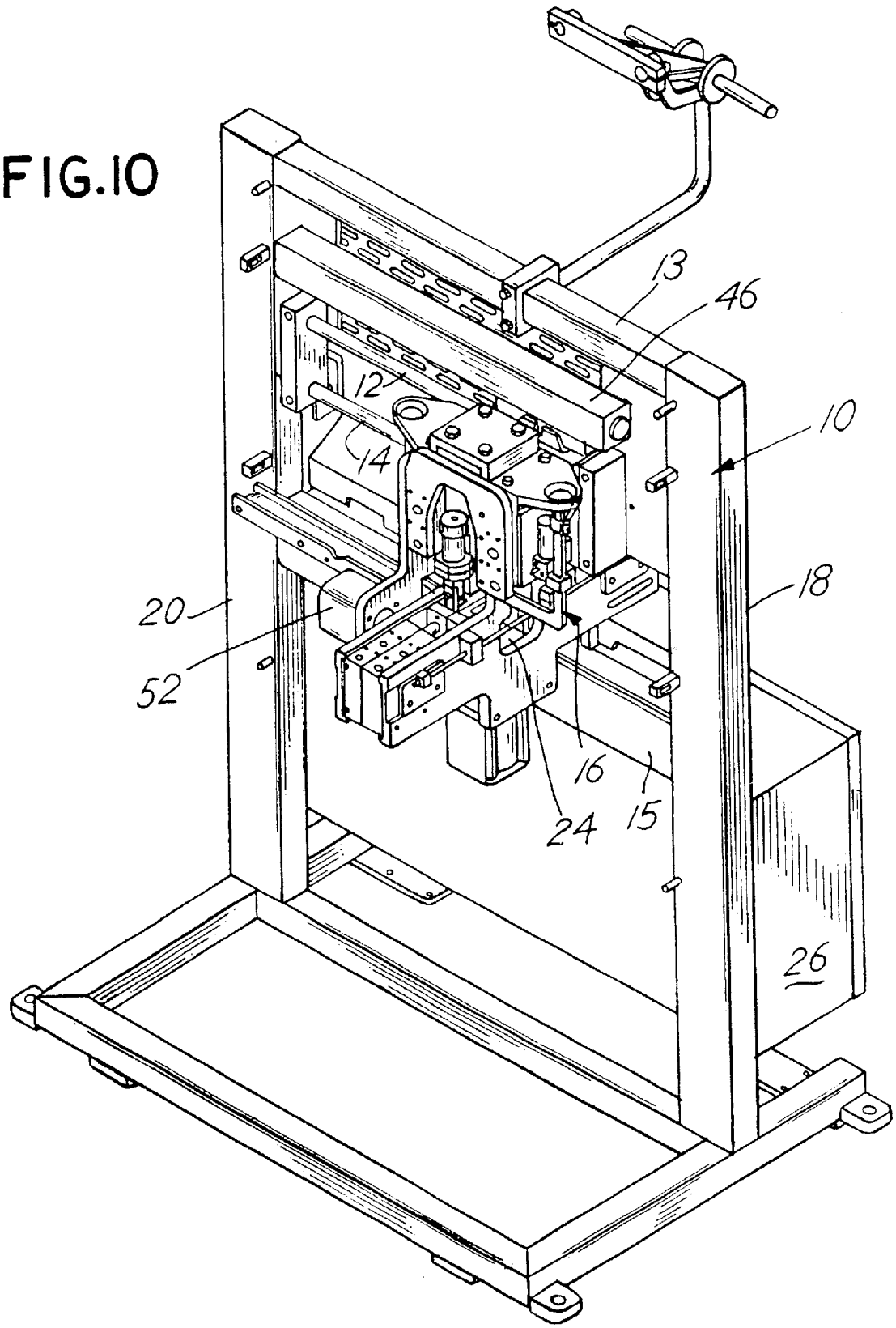
FIG. 10 is an isometric view of the total packaging apparatus wherein the clipper assembly is incorporated therewith without the guard frame.

Referring to FIG. 8 and FIG. 9, the clipper assembly 16 is slidably mounted on the rail rods 12 and 14. The assembly 16 is driven reciprocally back and forth on rail rods 12, 14 by means of a reciprocal actuator 46. The actuator 46 may be hydraulic, pneumatic or otherwise. The actuator 46 connects with the assembly 16 by means of a bracket 41 which is driven horizontally back and forth by actuator 46 in response to control signals from control box 26.

The clipper assembly 16 further includes a first clipper 34 and a second clipper 36. Clips 28, 30 are fed through channels 39 and 40 respectively to be driven by a punch 43 against an anvil 44. The punch 43 and anvil 44 are driven by means of a piston assembly 38 to attach the clips 28, 30 to casing material 22 passing through the assembly 16. Gathering plates (described below) are associated with gathering blocks carried on the assembly 16. The plates close or clamp upon casing material 22 passing through the assembly to form a constricted neck. Then the blocks separate one from the other through an eccentric or another mechanism driven by a motor or piston 52 so as to provide an elongated neck in the casing 22.

Figure 11:
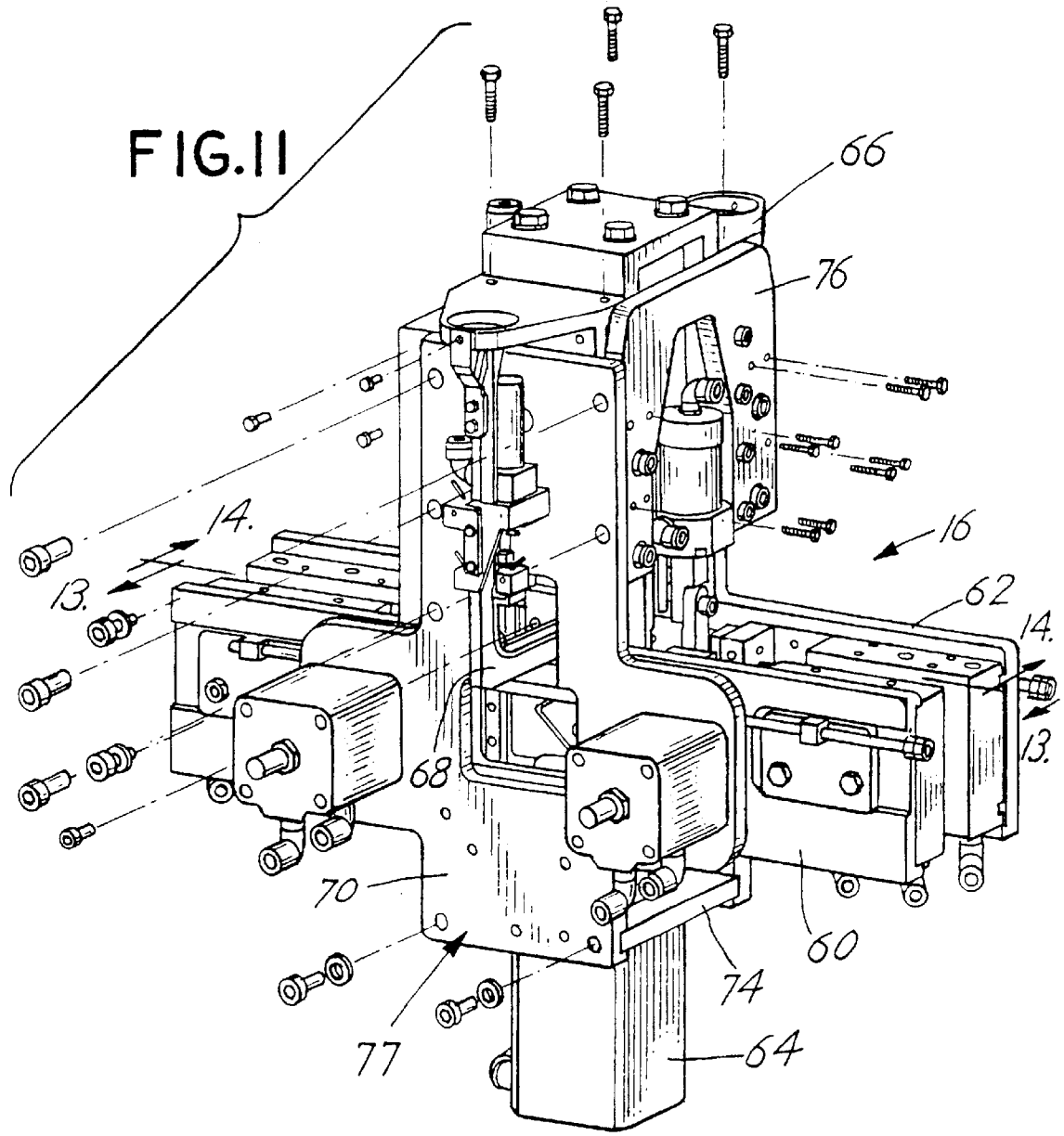
FIG. 11 is an isometric view of the gathering, voiding and clip attachment assembly of the apparatus viewed from the downstream side of the assembly.
Figure 12:
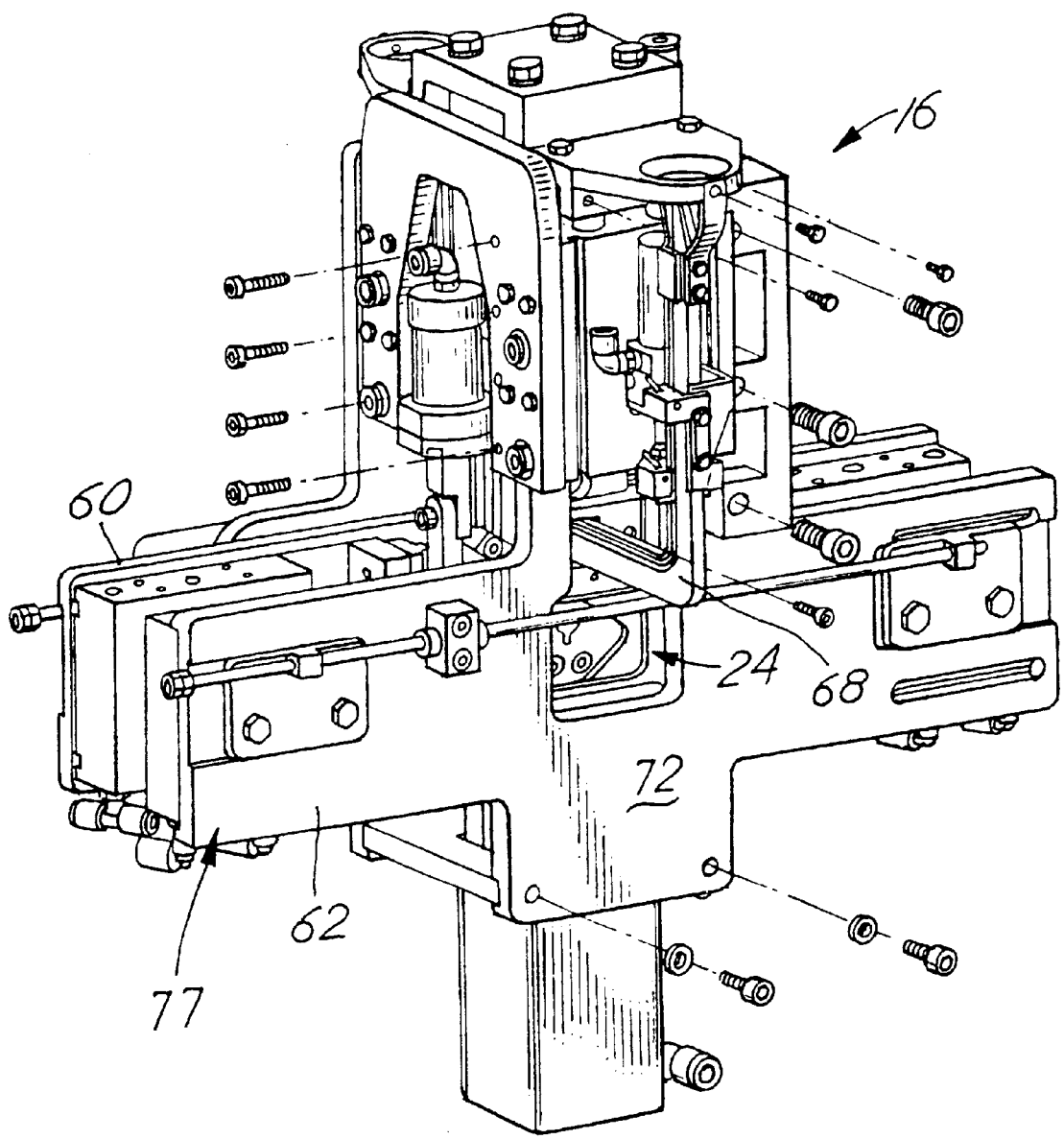
FIG. 12 is an isometric view of the assembly of FIG. 11 viewed front the opposite or upstream side.
Figure 15:
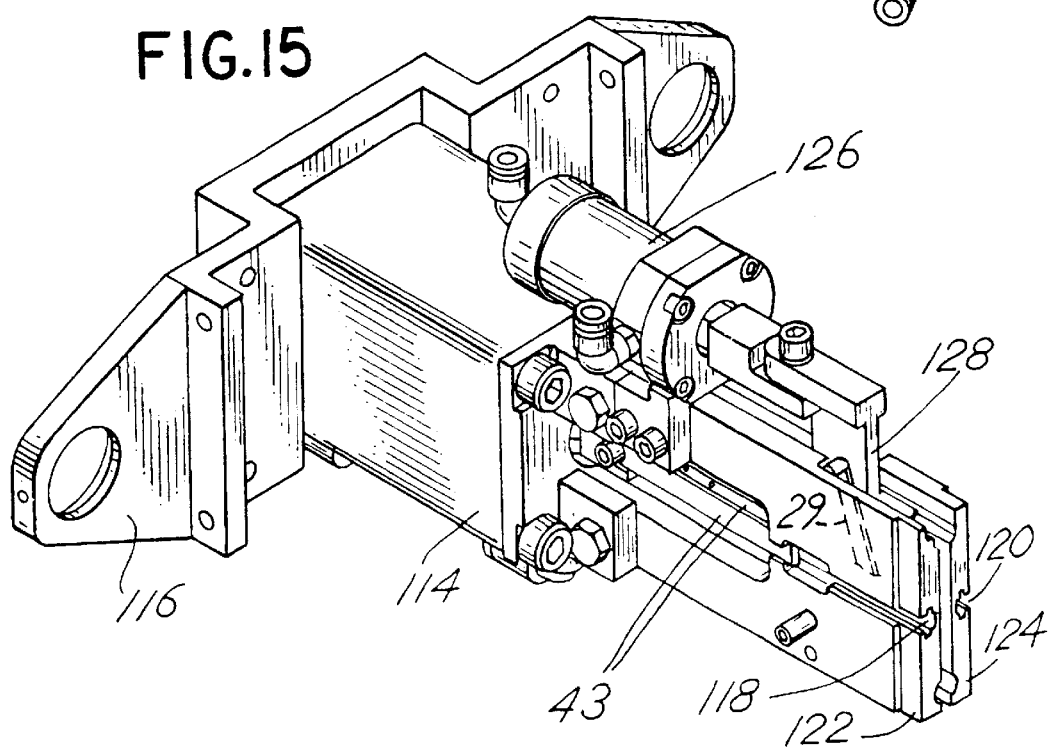
FIG. 15 is a cutaway isometric view of the upper clipper subassembly of FIG. 11.
Figure 16:
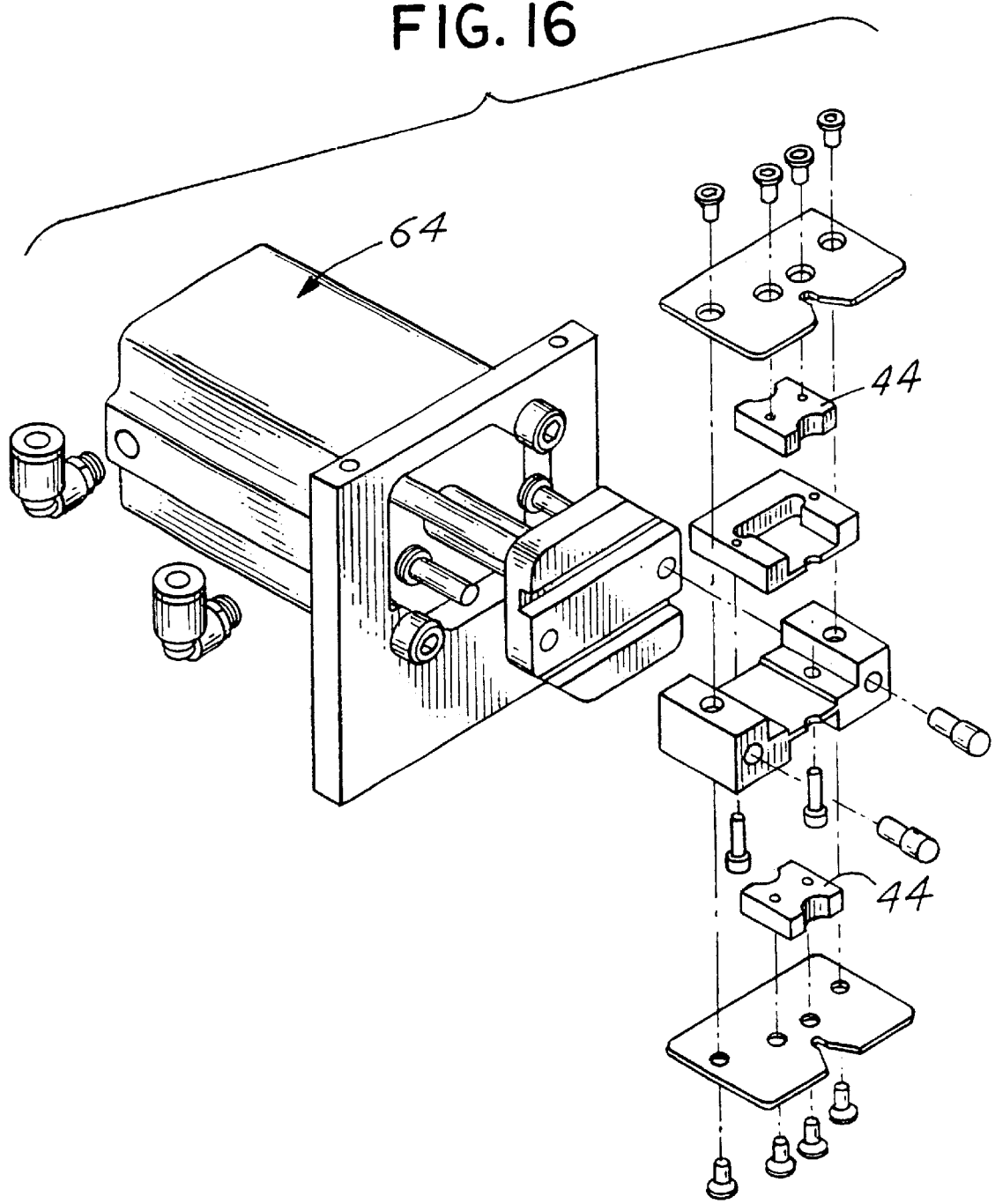
FIG. 16 is an exploded isometric view of the lower clipper or clipper anvil subassembly of FIG. 11.

FIGS. 11–15 illustrate in greater detail the construction of the clipper assembly 16 which is reciprocally mounted on the rods 12 and 14 for horizontal, reciprocal motion between the stations between the vertical frame support members 18 and 20. FIG. 11 depicts a downstream isometric view of the clipper assembly 16. FIG. 12 depicts an upstream side of the clipper assembly 16. FIG. 13 is a cutaway isometric view depicting the movable voider assembly and blocks. FIG. 14 is an isometric view depicting the stationary voider assembly and blocks. FIG. 15 is an isometric view of an upper clipper subassembly associated with the punches which drive clips down channels against an anvil to form the clips 28, 30 about the gathered casing 22. FIG. 16 is an isometric view, of a lower anvil subassembly of a lower clipper assembly.

Referring first, therefore, to FIGS. 11 and 12, the clipper assembly 16 is comprised of a movable voider assembly 60 which is opposed to a fixed voider assembly 62. The voider assemblies 60 and 62 are arranged in opposed facing relationship and are movable with respect to one another between a position wherein the moveable assembly 60 is positioned tightly against the fixed assembly or immovable assembly 62 and a position wherein the assemblies 60, 62 are spaced from one another following their gathering and necking operations.

The clipper assembly 16 further includes a lower clipper anvil subassembly or mechanism 64 (FIG. 16) and an upper clipper subassembly 66 (FIG. 15). Rails 68: are provided on opposite sides of the assembly as shown in FIG. 11 and 12 feeding clips into the clipper assembly 16. The described assemblies and subassemblies are all mounted on a bracket comprised of spaced vertical plates 70 and 72 connected together by horizontal connecting plates 74 and 76. The plates 70, 72, 74 and 76 thus form a rigid bracket, frame or structure 77 upon which the stationary and movable voider assemblies 60 and 62, as well as the lower clipper subassembly 64 and upper clipper subassembly 66 are mounted. The stationary voider assembly 62 is rigidly mounted to the described structure. The movable voider assembly 60 is movable within the bracket 77 so as to be movable between a first position immediately adjacent the stationary voider assembly 62 and a spaced position relative to the stationary voider assembly 62. The lower and upper clipper subassemblies 64 and 66 are rigidly attached to the described bracket 77 and do not move relative to other component parts, although the upper clipper assembly 66 includes clip channel plates and punches which move to drive clips from the rails 68 into engagement with moveable anvils associated with the lower clipper subassembly 64. Thus, lower subassembly 64 will position an anvil appropriately relative to gathered and necked casing for engagement with clip 28, 30 drive by punches through clip channel plates.

FIG. 13 depicts the movable voider assembly in an isometric view sectioned in a manner to illustrate the internal or inside of the voider assembly 60. That is, the voider assembly 60 includes cylinders 80 and 82, each with a piston connected respectively to blocks 84 and 86 by means of a rod. This enables the blocks 84 to move simultaneously, equally and reciprocally back and forth in the direction depicted by the arrow in FIG. 13. The blocks 84 and 86 also include transverse cylinders which include rods 90 and 92 connected with gathering plates 94 and 96 respectively. The plates 94 and 96 may be driven toward or away from each other as depicted by the arrows on block 86 in FIG. 13 and block 84 in FIG. 13. The plates 94, 96 include shaped openings, such as opening 98, through which filled casing 22 may be inserted. The shaped openings 98 have a narrow or V-shaped end such as end 100 of plate 96. The separate plates 94, 96 each have the described shape and the narrowed ends 100 so that when the plates 94, 96 are separated or moved horizontally, the narrowed ends 100 will come together and gather material inserted through the opening 98 defined by the plates 94, 96, thereby forming a neck in the casing material 22 in that opening 98.

FIG. 14 depicts the construction of the stationary voider assembly which is substantially a mirror image of the construction depicted in FIG. 13 associated with the movable voider assembly. Thus, the stationary assembly includes gathering plates 102 and 104 which include an opening 106 that is closed by actuation of driver blocks 108 and 110 to constrict casing material 22 passing through the opening 106. Blocks 108, 110, however, do not move relative to bracket 77.

In operation, the casing material 22 is passed through the openings 98 in plates 94, 96, 102 and 104. The plates 94, 96, 102, 104 are then driven in a horizontal direction towards one another to constrict the opening defined by the plates 94, 96, 102 and 104 along the center line through the passage 24 of assembly 16 uniformly about the center line of opening 24. This effects gathering of the casing material 22.

The movable voider assembly 60 is then actuated by operation of the cylinder and pistons 80, 82 to separate the assembly 60 including plates 94, 96 from adjacent the plates 102, 104 in the direction of casing movement thereby necking the casing material 22 and voiding a portion or length of the casing material 22 as the plates 94, 96 separate or become spaced from the plates 102, 104. The plates 94, 96, 102 and 104 are thus immediately adjacent one another initially and are also in their full open or overlapping position such as illustrated in FIGS. 13 and 14. Casing material 22 is then inserted through the opening 98 defined by the plates 94, 96, 102, 104. The plates 94, 96, 102 and 104 are then driven in a manner so that they slide relative to one another in a direction transverse to the center line of the casing material 22. This necks or narrows the casing material 22. The plates 94, 96 are then driven or moved in the same direction as the axis of the casing 22 to separate longitudinally from plates 102, 104. This effects the necking operation.

Thereafter, the lower clipper subassembly 64 positions an anvil 44 between the spaced plates 94, 96, 102 and 104 of the respective voider assemblies 60, 62 while simultaneously the upper clipper subassembly 66 drives spaced clips 28., 30 against the anvil 44 to attach the clips 28, 30 about to gather casing material 22. As shown in FIG. 15, the upper subassembly includes a drive cylinder 114 mounted on a mounting bracket 116. The drive cylinder drives clips 28. 30 down channels 118 and 120 about gathered casing material 22. Note that the channels 118 and 120 are formed in separate, spaced plates 122 and 124 which are transported adjacent anvil 44 before clips 28, 30 are attached. This also enables a cylinder 126 to operate a knife blade 128 to drive the blade 128 into the space between the plates 122 and 124 so as to sever casing 22 about which the clips 28, 30 have been placed.

The anvil 44 is thus positioned in an opposed relationship to the clip channels 118, 120 associated with the upper clip subassembly 66. In other words, the lower clipper subassembly 64 moves anvil 44 into position immediately adjacent the center line axis of the casing material 22 in the assembly 16. Simultaneously, the upper clipper subassembly 66 is operated to move the separate plates 122 and 124 in position with respect to the anvil 44 to define clip channels 118, 120 in which separate punches then move to drive clips 28, 30 through those channels 118, 120 into engagement with the anvils 44 and around the neck portion of casing material 22. By the time, or when, the various assemblies and subassemblies reach the second station, all of the described elements are retracted from the center line axis of the casing material 22 and the casing 22 has been optionally severed so that the casing material 22 may continue to move in an uninterrupted fashion through the apparatus and further so that the clipper assembly 16 may move in the reciprocal direction to the first station for repeat of its cyclical operation.

It is contemplated that various types of clipper mechanisms may be used in conjunction with the described apparatus. Among the important features of the assembly, however, is the maintenance of the various gathering plates, anvil punches, etc. in alignment and moveable so as to maintain necking of the casing material 22 and attachment of clips 28, 30 thereto along a center line axis of the casing material 22 as it passes through the apparatus. Smooth and efficient movement of the casing, material through the apparatus is thus promoted without undue stress on the casing material 22 as it is being gathered and clips are being attached thereto.

Various alternative embodiments of the invention are considered to be within the scope of the invention which is limited only by the following, claims and equivalents thereof.

What is claimed is:

1. Apparatus for attaching a shaped metal clip at intervals to casing filled with a viscous product, said apparatus comprising, in combination:

a support frame;

a clipper assembly;

a clipper assembly mounting rail for reciprocally mounting the clipper assembly on the frame for reciprocal movement back and forth between a first casing entry station and a second casing exit station, a continuous filled tube of casing entering the apparatus at the first station, exiting at the second station and clipped intermediate the first and second station by the reciprocating clipper assembly;

a clipper assembly reciprocation mechanism for reciprocating the clipper assembly on the rail between the first and second stations;

said clipper assembly including a filled casing support passage through which filled casing is directed as said casing extends between the first and second station, said clipper assembly further including first and second casing gathering plates which are projectible into the passage to gather the filled casing to form a neck section therein for attachment of at least one clip about the casing, said clipper assembly further including a clipper mechanism for attachment of a clip about gathered casing; and a control mechanism for the apparatus to synchronously operate the reciprocation mechanism with movement of casing between the first and second stations and to simultaneously operate the gathering plates and clipper sequentially only during synchronous movement of the clipper assembly from the first to the second station, and otherwise for release and disengagement of the plates and clipper, whereby filled casing is continuously moving through the apparatus and gathered and clipped during said movement but only when the clipper assembly is synchronously moving therewith.

2. The apparatus of claim 1 including first and second sets of gathering plates, said first and second set spaced from one another in the direction of casing travel and including a mechanism for separating the first and second set of plates for access of the clipper to gathered casing therebetween for attachment of a clip.

3. The apparatus of claim 2 further including a double clipper for attaching spaced clips to the gathered casing between the sets of plates.

4. The apparatus of claim 3 further including a cutting mechanism in the clipper assembly for cutting clipped casing between spaced clips.

* * * * *